United States Patent
Angibaud

[15] 3,671,734
[45] June 20, 1972

[54] RELOADABLE ELECTRIC FLASHLIGHT

[72] Inventor: Rene M. Angibaud, Bois-Jerome, France

[73] Assignee: Societe Les Piles Wonder, Saint Ouen (Seine Saint Denis), France

[22] Filed: Dec. 21, 1970

[21] Appl. No.: 99,776

[30] Foreign Application Priority Data

Dec. 23, 1969 France..................................6944538

[52] U.S. Cl.........................................................240/10.66
[51] Int. Cl...........................................................F21l 7/00
[58] Field of Search.........................240/10.66, 10.61, 10.68; 136/110, 173

[56] References Cited

UNITED STATES PATENTS 1,398,799 11/1921 Recker....................................136/110
1,176,467 3/1916 Koretzky..................................136/110
3,486,944 12/1969 O'Donnell................................136/173

*Primary Examiner*—S. Clement Swisher
*Attorney*—Woodhams, Blanchard and Flynn

[57] ABSTRACT

A battery and case assembly attachable to the head of a flashlight to facilitate replacement of batteries. The head has a recess and the case has a closure member at the end thereof received into the recess. The closure member includes a pierced cap and readily breakable means attaching the cap to an annulus around the cap. A sleeve secured to the annulus spaces the batteries from the annulus and prevents normal electrical contact with the batteries until the cap is detached from the annulus.

2 Claims, 3 Drawing Figures

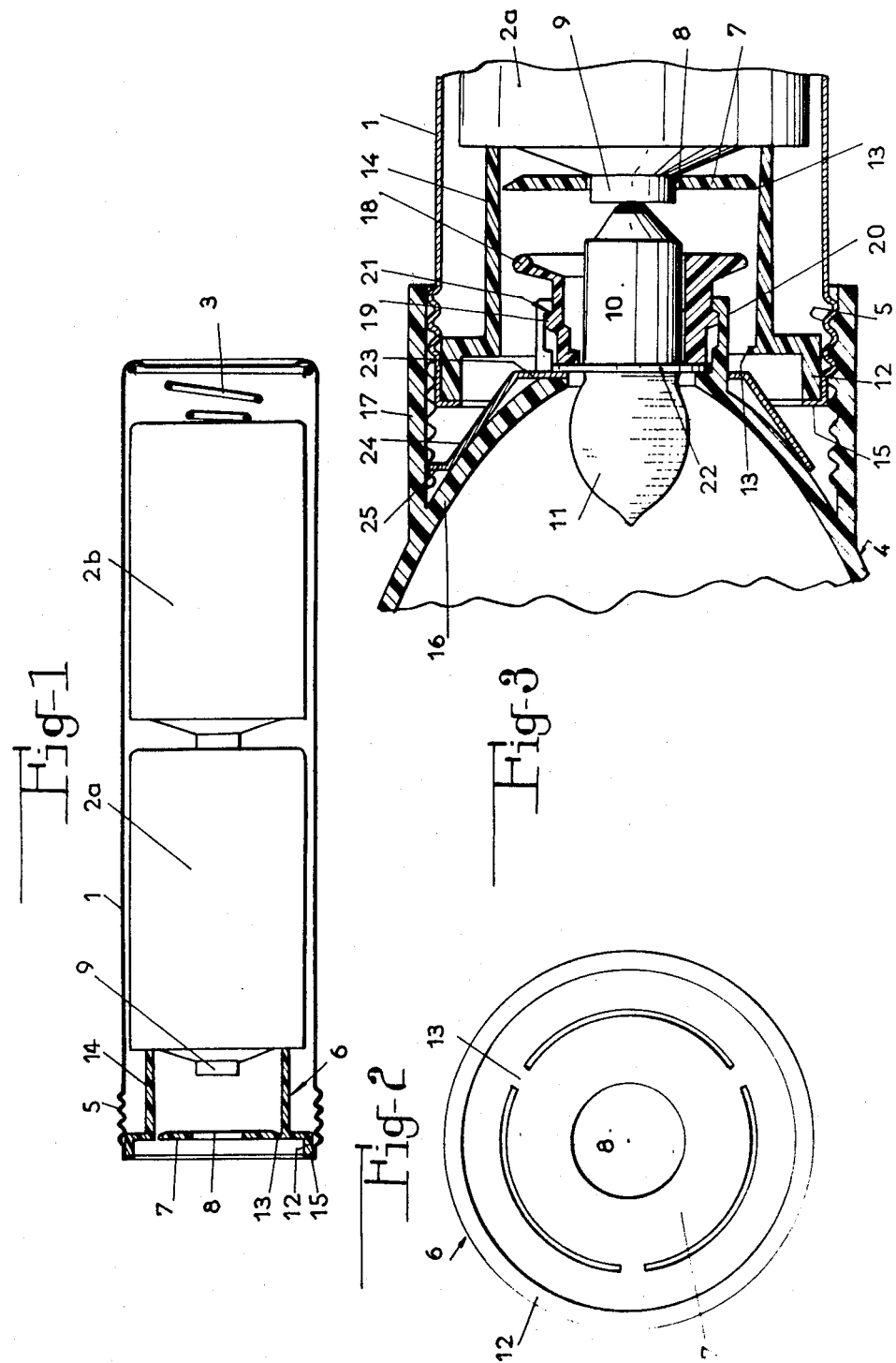

RELOADABLE ELECTRIC FLASHLIGHT

This invention relates in general to a reloadable electric flashlight comprised of a bulb supporting head and a cylindrical case containing one or several cylindrical batteries superimposed upon each other. The negative pole of the lowermost battery is supported on the bottom of the case by means of a spring. The upper end of the case is capable of being attached to the head of the electric flashlight by attaching means comprising a recess in the said head in which the top end of the case is received and held.

When reloadable or replacement batteries of this type are used or discharged, the user must replace them by new batteries, which obliges him to carry out a certain number of operations which, however simple, require his careful attention. He must take care, in particular, to replace each of the batteries in the proper polarity within the casing. On the other hand, it sometimes occurs by mistake, that the user replaces the used batteries with other previously used batteries, due to the fact that there is generally no means of determining whether the replacement batteries are new; he must then repeat his actions and proceed by a process of elimination to find a combination of new batteries.

The purpose of this invention is to remedy the foregoing inconveniences and, in particular, to permit the total replacement of used batteries by new batteries, with a minimum of operational steps.

This can be accomplished by furnishing a reloadable electric flashlight according to the invention which is characterized in that the case is closed at its upper end by a closure device comprised of a cap, pierced with a central hole, and of an annular peripheral member attached to the cap by easily breakable attaching elements. Said annular member is extended by a cylindrical spacer which receives its support on the adjacent end of the nearest cylindrical battery in the region of its positive pole.

It is thus understood that, when the batteries contained in the case are used, the operator or user can replace the used assembly with a reload comprised of the new batteries and the case which contains them. In fact, it is impossible to replace the batteries while retaining the same case, due to the fact that this case is sealed by the closure device. The cost of the case is minimal by comparison with that of the batteries, and its importance is insignificant, especially if one considers the important advantages which flow from this arrangement. This is, by the fact that the used assembly is replaced by a new assembly, it is not possible to effect an inversion of the polarity of one or more of the batteries, and the operator is thus assured of achieving always, without special attention, an operable assembly. The batteries are, in fact, arranged in the proper order, once and for all, at the time of manufacture.

On the other hand, the operator is certain that the batteries are new, without having to determine such from other testing, simply by observing that the attaching elements are not broken. In fact, if the cap is still attached to the annular peripheral member by the said attaching elements, it is impossible that the batteries contained in the case could have been used.

The cylindrical spacer, which extends from the annular member of the closure device, spaces the positive post from the cap so that the said post cannot be reached through the central hole of the cap for normal use.

The positive post is arranged, as in the majority of flashlights, to be contacted by the conductive metallic end of the light bulb, which comprises part of the head of the flashlight. One can see that, by means of this invention, this connection is very easy to effect. When the case is attached to the head of the flashlight, and because the case is recessed into the flashlight head, a part of the head, for example, the base of the lightbulb, comes into engagement with the cap. At an instant preceding the complete recessing of the case into the head, the connecting elements between the cap and the annular member are broken, due to the pressure exerted by the said part of the head. During subsequent recessing, the positive post of the adjacent battery is engaged permanently with the conductive metal end of the light bulb. This contact is excellent, due to the presence of the spring which pushes the batteries toward the head. The cap no longer serves any function and falls against the uppermost battery, the positive post of the uppermost battery extending through the central opening in said cap.

A preferred embodiment of the invention is represented by way of example in the attached drawings, in which:

FIG. 1 is a central, cross-sectional view of an unused reload assembly conforming to the invention and ready for use as part of an electric flashlight;

FIG. 2 is a top plan view of the reload battery unit shown in FIG. 1 and showing the closure device; and FIG. 3 is a fragment of a central, cross-sectional view of the same reload unit attached to the head of an electric flashlight.

For convenience in description, the terms "upper," "lower" and the like will have reference to the left and right ends, respectively, of the structure appearing in FIG. 1. The terms "in," "out" and the like will have reference to the geometric center of the said structure and parts associated therewith.

The reload unit of an electrical flashlight represented in the figures comprises a cylindrical case 1, preferably aluminum, containing two cylindrical batteries, 2A and 2B, of a conventional commercial type, one battery being on top of the other and mounted in series. The bottom of the lowermost battery 2B, which constitutes the negative pole of the batteries, is electrically connected to the case 1 by a helical spring 3. This case can be attached to the head 4 of an electric flashlight, by means of an external terminal thread 5, and thus constitutes the body of this flashlight, as it is best shown in FIG. 3.

The case 1 is sealed by a substantially cylindrical closure device 6 of molded plastic material, in this embodiment. This closure device 6 is comprised of a circular cap 7 pierced with a circular central opening 8, the diameter of which is slightly larger than that of the positive post 9 of the uppermost battery 2A, but slightly smaller than that of the base 10 of a commercial lightbulb 11. The closure device 6 includes an annular peripheral part 12 attached, when the reload unit has not been used (FIG. 1), to the cap 7 by three easily breakable attaching elements 13, disposed at 120° angles from each other, relative to the center of the cap 7. The annular part 12 is, moreover, extended by an annular spacing member comprised of a skirt or sleeve 14 which bears against the adjacent end of the uppermost battery 2A and surrounds the positive pole 9 thereof. The batteries are urged toward the closure device and against the skirt 14 by the spring 3. The upper edge of the case 1 is turned inwardly, as best shown at 15, so that the closure member cannot possibly be removed from the case, but can only be depressed into the case, contrary to the force exerted by the spring.

The head 4 of the flashlight is comprised principally of a reflector 16, preferably fabricated from plastic material in the form of a parabola. The reflector has an integral sleeve 17 extending downwardly and having an interior thread which can be threadedly engaged with the threaded upper end of the case 1. The lightbulb 11 is held in the head 4 by means of a receptacle 18 which has a radially outwardly projecting annular boss 19, which is received into a collar in the form of three elements 20, which are initially cast with the reflector. These elements 20 have inwardly facing, arcuate grooves which define the circle 21 and which cooperate with the boss 19 to prevent accidental disengagement of the receptacle from the head. The receptacle presses the flange 22 on the lightbulb 11 against the three inwardly extending tongues 23 of a conductive member 24 in the form of a frustrum of a cone, said tongues 23 passing respectively through each of the spaces provided between the elements 20 of the collar. The cone-shaped member 24 also has three outwardly extending tongues 25 spaced about 120 degrees from each other along the periphery of the large, upper end of the member 24. The tongues 25 are received into the longitudinal or axial grooves correspondingly arranged in the threading of the sleeve 17.

It is noted that the outward tongues 25 are in electrical contact with one terminal of the filament of the lightbulb by means of the member 24, the inward tongues 23, the flange 22 and the outer shell of the base 10 of the lightbulb.

The attachment to the head 4 of a new reload assembly, such as is shown in FIG. 1, is effected in the following manner:

The used battery and case assembly having been removed, the case 1 is threadedly attached to the sleeve 17 of the head 4. As the case is steadily moved into the interior of the head, the base 10 of the lightbulb comes into contact with the portion of the cap 7 surrounding the hole 8 therein. The threading action being continued, the closure device is urged downwardly into the case, contrary to the force exerted by the spring 3, the skirt or sleeve 14 urging the batteries toward the bottom of the case. When the pressure exerted by the base 10 against the cap 7 is sufficient, the attaching elements 13 are broken and the cap moves down toward the uppermost battery 2A. The post 9 of this battery 2A passes through the opening 8 in cap 7 and can thus come into contact with the conductive metal on the adjacent, lower end of the lightbulb, which is attached to the other terminal of the filament. The closure device 6 moves upwardly into abutting engagement with the inward turned edge 15 at the upper end of the case 1. The cap 7 no longer serves any useful purpose.

One sees that, if one continues to screw the case into the head, the upper end of the case can come into engagement with the outward tongues 25 of the cup 24. The conductive case being attached to the negative pole of the batteries, the light is illuminated. To extinguish the light, it is only necessary to unscrew the case slightly, the positive pole of the batteries then providing the only, hence incomplete, electrical contact with the terminals of the filament in the lightbulb. Thus, by means of the invention, it is very easy to effect the replacement of a used battery and case unit with a new battery and case unit.

The operator is assured that the batteries of a reload unit are new when he ascertains that the attaching elements 13, which secure the cap 7 to the peripheral portion 12 of the closure device, have not been broken. In fact, in this case, the spacer constituted by the skirt 14 holds the post 9 of the uppermost battery 2A too far from the opening 8 to permit normal use of the new reload unit, until it is properly attached to a head 4.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A reload assembly for an electric flashlight having a cylindrical case containing cylindrical battery means, the negative end of said battery means being supported upon a wall at one end of the case and electrically connected thereto by a resilient member, the flashlight including head means adapted to support a lightbulb and having means defining a recess into which the other end of the case is received and releasably held, characterized by:

closure means disposed within said case at said other end thereof said closure means having cap means adjacent said other end and pierced with a central opening, said closure means having annular means surrounding the periphery of said cap means and breakable attaching means connecting said cap means to said annular means; and sleeve means secured to said annular means and extending axially of said case for engagement with the adjacent, positive end of said battery means, whereby the positive terminal of battery means is obstructed from electrical contact until said cap means is disengaged from said annular means by the breaking of said attaching means.

2. A reload assembly according to claim 1, wherein the attaching means is automatically broken by the base of the lightbulb as the case is received into the recess of the head means and, thereafter, said lightbulb base electrically contacts said battery means through the opening in said cap means.

* * * * *